July 29, 1924.
H. A. VALLEZ
CAKE CUTTER FOR FILTER PRESSES
Filed Sept. 30, 1921     3 Sheets-Sheet 2
1,502,700
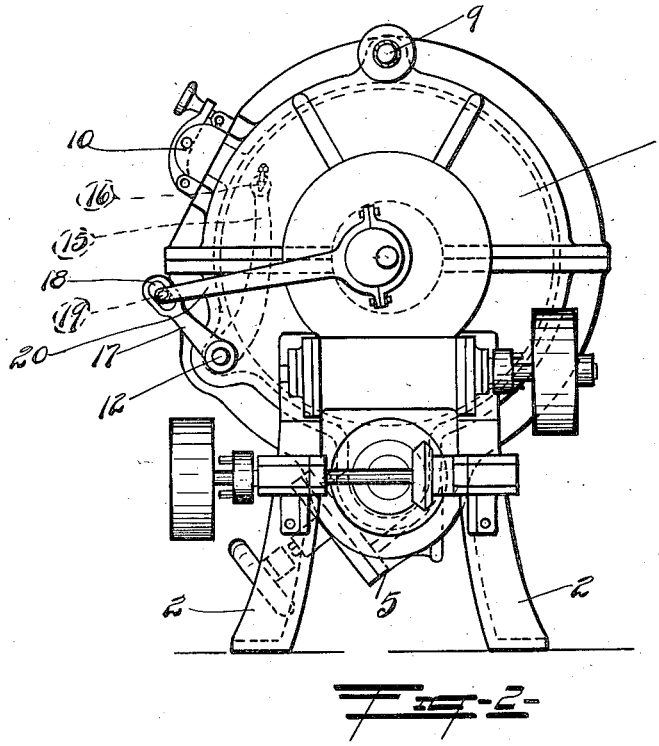
Fig-2-
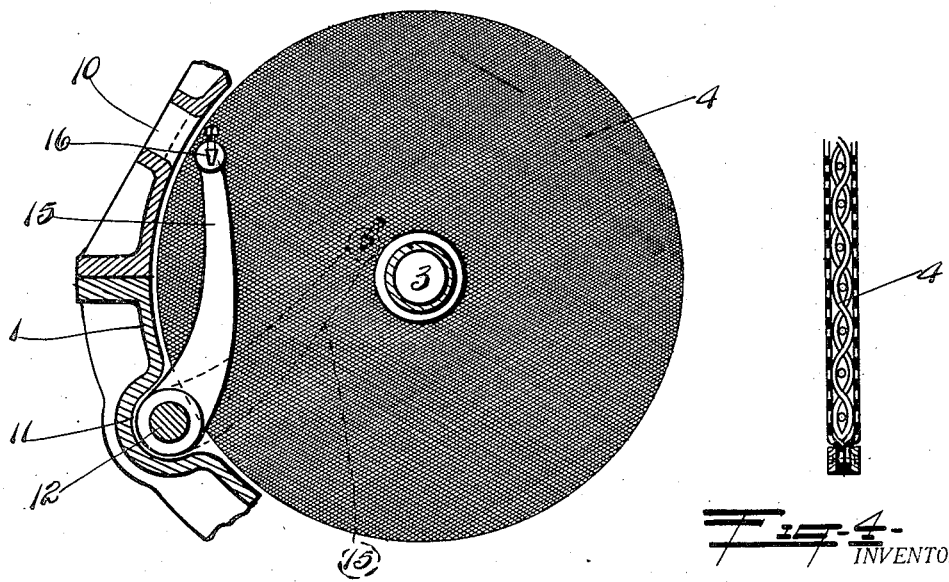
Fig-3-     Fig-4-
INVENTOR.
Henry A. Vallez.
BY Frank C. Farman.
ATTORNEY.

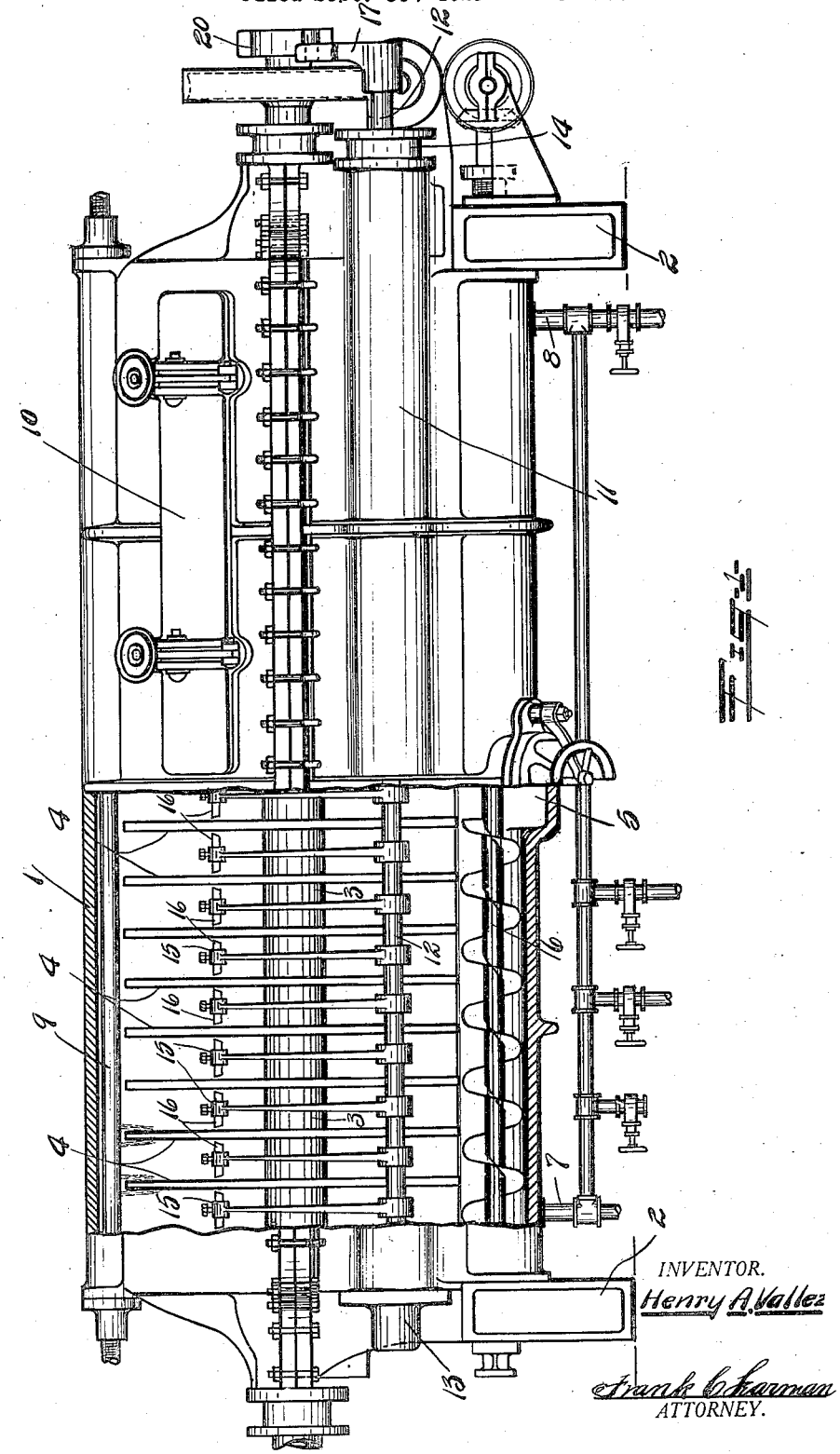

July 29, 1924.
H. A. VALLEZ
CAKE CUTTER FOR FILTER PRESSES
Filed Sept. 30, 1921  3 Sheets-Sheet 3
1,502,700
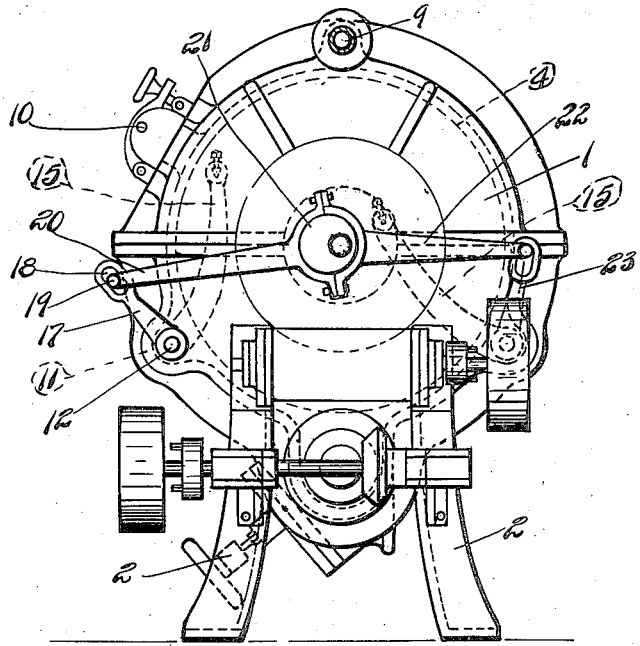
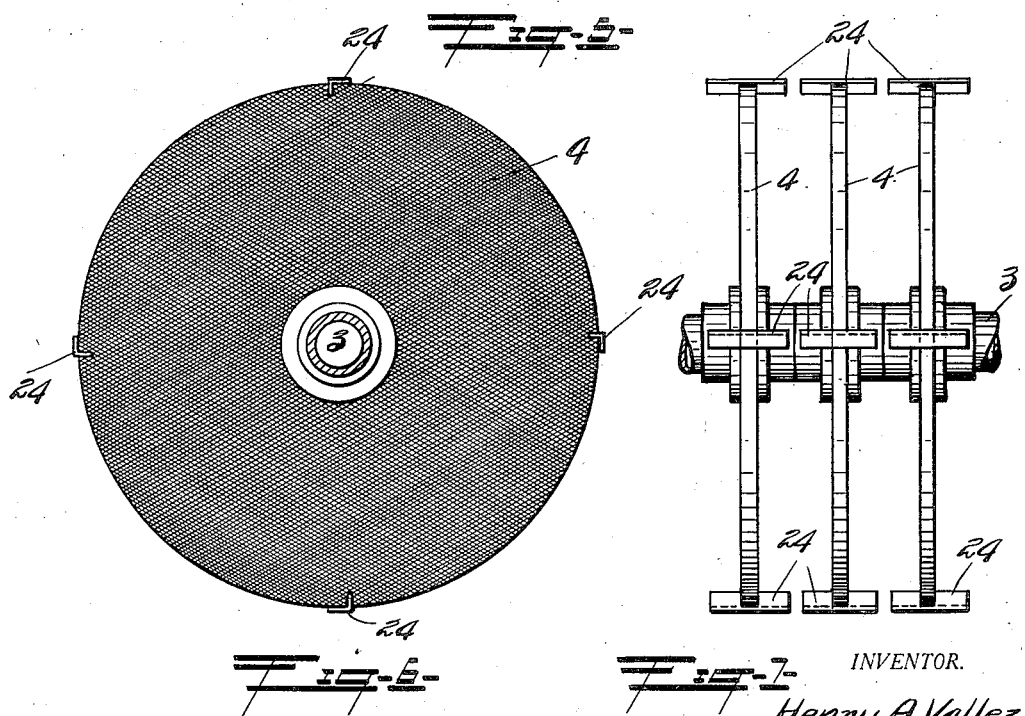
INVENTOR.
Henry A. Vallez.
BY Frank C. Fairman
ATTORNEY.

Patented July 29, 1924.

1,502,700

UNITED STATES PATENT OFFICE.

HENRY A. VALLEZ, OF BAY CITY, MICHIGAN.

CAKE CUTTER FOR FILTER PRESSES.

Application filed September 30, 1921. Serial No. 504,461.

*To all whom it may concern:*

Be it known that I, HENRY A. VALLEZ, a citizen of the United States of America, and a resident of Bay City, in the county of Bay and State of Michigan, have invented certain new and useful Improvements in Cake Cutters for Filter Presses, of which the following is a specification.

This invention relates to filter presses and the like, and particularly to means for removing the cake from the filter elements.

Filter presses of this type are used for filtering solutions of all descriptions, and comprises a shell having a series of filter elements rotatably mounted therein, and on which a cake is formed due to the deposit of the precipitate thereon, this cake gradually thickens during the process of filtration, and naturally retards the filtration through the filter elements necessitating cleaning the cake from the element when it is of certain thickness, it is very difficult to clean this cake from the frames comprising the filtering element especially when filtering certain solutions.

One object of the invention is to provide means for automatically, evenly and efficiently removing the cake from the frames comprising the filtering element when it has reached a certain predetermined thickness.

Another object is to provide a plurality of removable knives or cutters, which are adapted to be oscillated back and forth across the face of the frames when cleaning, the ends of the cutters being carried in close proximity to the face of the said frames.

A further object of the invention is to provide a very simple mechanism which will not stick or become gummed and thereby impair the efficiency of the attachment.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction without departing from the spirit or sacrificing any of the advantages of the invention.

In the drawings:—

Figure 1 is a part sectional side elevation of my improved filter illustrating the cutters in place thereon.

Figure 2 is an end view of the press showing the drive for the cutters.

Figure 3 is an enlarged fragmentary sectional view of the press and one of the frames illustrating the cutters in two different positions.

Figure 4 is a fragmentary sectional view of one of the frames.

Figure 5 is a view similar to Figure 2, showing the press provided with two sets of cutter holders for use as thickeners.

Figure 6 is a view of the face of one of the frames illustrating the scrapers or cleaning angles attached thereto, and, Figure 7 is an edge view thereof.

Referring now particularly to the drawings in which I have shown the preferred embodiment of my invention, the filter press comprises a shell 1 divided on the horizontal center line into two halves which are supported by the legs 2. A hollow shaft 3 extends longitudinally through this shell, the filter elements being mounted thereon and comprising a plurality or series of frames 4 mounted adjacent to and spaced from each other, and in operation the solution in the press filters through the frames, enters the hollow shaft through an opening in the hub of each frame and flows out through the said shaft.

A discharge opening 5 is located in the bottom of the shell and a right and left hand screw conveyor 6 is carried in the lower trough shaped portion thereof, and is adapted to convey the cake to the discharge opening 5 when the frames are being cleaned. Pipe connections 7 and 8 are provided in the bottom of the shell for the purpose of admitting the solution to be filtered, and a spray pipe 9 is located in the top of the shell for the purpose of directing a spray, under pressure, against the face of the frames (as they revolve) for cleaning the frames when filtering certain solutions, this pipe is also provided with air connections so that compressed air can be used when desired. The shaft 3 is a driven shaft and is driven from any suitable source of power, being provided with the necessary stuffing boxes, etc., to insure the shell being tight and leakproof. Inspection doors are also located in one side of the shell and allow the frames and interior of the press to be inspected when desired.

The manner of drive for the screw conveyor and the main shaft is immaterial and can be accomplished in any manner as this invention is directed to the means for cleaning the cake from the surface of the frames.

The shell is constructed substantially as shown in Figure 1 of the drawings, having a longitudinally extending recess 11 formed in the side of the lower half thereof, a shaft 12 being mounted therein and is journaled in boxes 13 formed at either end of the shell, a stuffing box 14 being provided at the one end to prevent leakage, as the press is operated under vacuum. Arms 15 are mounted on this shaft 12 in spaced relation to each other between the frames, and a cutter 16 is inserted in a suitable opening in the free end of the arm, and is secured in place by means of a set screw or the like, this cutter element being of a length so that the ends thereof are spaced about one quarter of an inch from the face of the fabric or covering of the frames, so that when the cake is removed from the frame, approximately one quarter of an inch thereof will remain thereon, in certain classes of filtration, a filtering medium such as kieselguhr, fuller's earth, or some other filtering medium is employed, and this is usually prepared as a solution and circulated through the press, being deposited on the frames to about one quarter inch thickness, thus when the cake is removed, the filtering medium will not be disturbed, and as the cutters do not contact with the cloth or other material covering the frames, it cannot be damaged or in any manner mutilated thereby, and this filtering medium is removed by means of the spray under pressure and the liquid used in this spray can be the same as the solution being filtered and is circulated back through the press when it is filled so that there will be no wastage.

The cutter arms are keyed on this shaft 12 and are adapted to be oscillated or rocked by means of an arm 17 keyed on the end of the shaft 12, the free end of the said arm being slotted as shown at 18, and is adapted to receive the pin 19 secured in the end of the eccentric rod 20, this eccentric being split and is mounted on the eccentric sleeve 21 which is in turn keyed on the main drive shaft 3, and it will be obvious that as the shaft 3 revolves the member 21 will revolve therewith and convey motion to the members 17 and 20, thereby oscillating the shaft 12 and swinging the cutters 16 back and forth across the face of the filter elements as they revolve, the throw of the eccentric being sufficient to move the cutters from the outer edge of the frame to the edge of the hub flange by means of which the frames are secured in place, and while I have shown these arms extending upwardly it will be understood that they can hang downwardly if desired, and the cake being cut will then fall directly into the trough instead of on the side of the shell. In practise a clutch mechanism (not shown) is provided so that when the cake is of a certain thickness the cutter actuating mechanism is operated and the cake cleaned from the frame, the clutch is then disengaged until it is again necessary to remove the cake.

The cutter element can be of any desired shape or form to properly cut the cake, and it is preferable that they be removable so that they can be removed and replaced when desired, the inspection doors being convenient for this purpose.

Ofttimes it is desirable to continuously stir and agitate the solution in the press while it is being filtered, and this same mechanism and arrangement can be used for this purpose, the opposite side of the shell being formed identically similar, and is provided with a similar set of arms as clearly shown in Fig. 5 of the drawings, these are connected to another eccentric and arms 22 and 23 respectively, and are so timed that when one set of cutters is at the outer edge of the frames, the opposite set will be near the hub of the main shaft, these are of course continuously operated during the filtering process.

Scrapers 24 are secured to the outer edges of the frames as shown in Figures 6 and 7 for cleaning and scraping the inside of the shell, these are spaced to allow the arms 15 to freely pass between them as the filter elements revolve.

From the foregoing description it will be obvious that I have perfected a simple and efficient cake cutter which will automatically remove the cake from the face of the filter elements.

What I claim is:—

1. In a device of the class described, a casing horizontally disposed, filter elements rotatably mounted therein and spaced from each other, a longitudinally extending shaft adjacent said filter elements, and means mounted on the shaft adapted when actuated to remove the cake formed on the face of the filter elements.

2. In a device of the class described, a casing horizontally disposed, filter elements rotatably mounted therein and spaced from each other, a longitudinally extending shaft adjacent said filter elements, and a plurality of cutter elements mounted thereon, and means for oscillating the said shaft to swing the cutter elements across the face of the frame to cut the cake therefrom.

3. In a device of the class described, a casing horizontally disposed, filter elements rotatably mounted therein and spaced from each other, a recess in the said casing and a shaft mounted therein, arms mounted on the shaft between the filtering elements, cutters carried by the said arms, and means for oscillating the said shaft to swing the cutters across the face of the filter elements.

4. In a device of the class described, a casing, a plurality of horizontally disposed filter elements rotatably mounted therein and spaced from each other, a recess formed in the side of the casing and having a longitudinally extending shaft journaled therein, arms mounted on the said shaft between the filter elements, cutters having beveled ends detachably mounted on the said arms, and means for oscillating the said shaft to swing the cutters across the face of the filter elements.

HENRY A. VALLEZ.